United States Patent
Pugliese et al.

(10) Patent No.: US 11,642,693 B2
(45) Date of Patent: *May 9, 2023

(54) ALIGNMENT DEVICES

(71) Applicant: HEWLETT-PACKARD DEVELOPMENT COMPANY, L.P., Spring, TX (US)

(72) Inventors: Roberto A. Pugliese, Corvallis, OR (US); Jeffrey A. Nielsen, Corvallis, OR (US); Christie Dudenhoefer, Corvallis, OR (US); Craig Olbrich, Corvallis, OR (US); Debora J. Thomas, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/672,442

(22) Filed: Feb. 15, 2022

(65) Prior Publication Data

US 2022/0168773 A1  Jun. 2, 2022

Related U.S. Application Data

(62) Division of application No. 16/766,246, filed as application No. PCT/US2018/015840 on Jan. 30, 2018, now Pat. No. 11,278,928.

(51) Int. Cl.
*B05C 11/00* (2006.01)
*B05C 5/02* (2006.01)

(52) U.S. Cl.
CPC .............. *B05C 11/00* (2013.01); *B05C 5/02* (2013.01)

(58) Field of Classification Search
None
See application file for complete search history.

(56) References Cited

U.S. PATENT DOCUMENTS

| | | | | |
|---|---|---|---|---|
| 5,334,249 A | * | 8/1994 | Osbon | B05C 11/1021 118/701 |
| 5,437,727 A | * | 8/1995 | Yoneda | B05C 5/0216 118/712 |
| 5,932,012 A | * | 8/1999 | Ishida | B05C 5/0212 118/712 |
| 6,039,211 A | | 3/2000 | Slater | |
| 6,117,490 A | * | 9/2000 | Nishida | B05C 5/0254 118/232 |
| 7,417,768 B1 | * | 8/2008 | Donovan | G06K 15/102 358/3.06 |
| 7,673,661 B2 | | 3/2010 | Chase | |

(Continued)

FOREIGN PATENT DOCUMENTS

| | | |
|---|---|---|
| RU | 2641473 | 1/2018 |
| WO | WO-2006036307 A2 | 4/2006 |

OTHER PUBLICATIONS

Dispensing Nozzle & Needle XYZ Calibration; Feb. 15, 2017; http://gpd-global.com/co_website/features-needlecalibration.php.

*Primary Examiner* — Jethro M. Pence
(74) *Attorney, Agent, or Firm* — Foley & Lardner LLP

(57) ABSTRACT

An alignment system, in an example, may include a substrate comprising at least one nanowell, at least one fluid ejection device comprising at least one die, the at least one die comprising as least one nozzle, and an alignment device to align the at least one nozzle to the at least one nanowell.

20 Claims, 6 Drawing Sheets

(56) References Cited

U.S. PATENT DOCUMENTS

| | | | |
|---|---|---|---|
| 8,118,414 B2* | 2/2012 | Tsuchiya | B05C 5/02 347/73 |
| 8,241,697 B2* | 8/2012 | Collier | C12Q 1/58 427/2.13 |
| 8,348,370 B2* | 1/2013 | Peters | G01N 35/1002 347/54 |
| 8,389,042 B2* | 3/2013 | Collier | C12Q 1/005 427/2.13 |
| 8,389,057 B2* | 3/2013 | Knox | H01L 21/6835 427/256 |
| 8,578,878 B2* | 11/2013 | Khoury | B05B 13/0609 118/712 |
| 8,794,179 B2* | 8/2014 | Tsuchiya | B41J 2/085 347/76 |
| 8,893,649 B2* | 11/2014 | Sato | B29C 59/002 118/712 |
| 8,916,241 B2* | 12/2014 | Khoury | B05B 12/008 118/712 |
| 9,575,407 B2* | 2/2017 | Sato | G03F 7/0002 |
| 9,579,843 B2* | 2/2017 | Okushima | G03F 9/7042 |
| 9,724,716 B2* | 8/2017 | Khoury | B05D 1/02 |
| 10,279,364 B2* | 5/2019 | Khoury | B05B 13/0228 |
| 10,670,961 B2* | 6/2020 | Okushima | G03F 9/7042 |
| 10,990,005 B2* | 4/2021 | Okushima | G03F 7/0002 |
| 11,135,579 B2* | 10/2021 | Hammerstad | B01L 9/56 |
| 11,391,660 B2* | 7/2022 | D'Apuzzo | G01N 15/1459 |
| 11,433,415 B2* | 9/2022 | Takeuchi | B05B 1/02 |
| 2004/0048001 A1* | 3/2004 | Kiguchi | H01L 21/76838 427/256 |
| 2006/0051250 A1 | 3/2006 | Gonzalez et al. | |
| 2006/0270059 A1 | 11/2006 | Huang et al. | |
| 2008/0305969 A1 | 12/2008 | Dijksman et al. | |
| 2010/0255600 A1 | 10/2010 | Farr | |
| 2010/0261611 A1 | 10/2010 | Peters | |
| 2011/0311716 A1* | 12/2011 | Taylor | B05B 15/55 118/316 |
| 2012/0225390 A1* | 9/2012 | Kobayashi | H01L 21/67748 430/432 |
| 2013/0011523 A1* | 1/2013 | Belzowski | A21C 9/04 426/89 |
| 2013/0029047 A1* | 1/2013 | Nakano | B41J 2/2146 118/313 |
| 2013/0192523 A1* | 8/2013 | Knox | H01L 21/6835 118/696 |
| 2013/0298827 A1* | 11/2013 | Yu | B05C 11/10 118/699 |
| 2014/0139583 A1 | 5/2014 | Kammerzell | |
| 2015/0353337 A1 | 12/2015 | Chase | |
| 2016/0205787 A1* | 7/2016 | Gothait | H05K 3/46 118/696 |
| 2018/0161803 A1* | 6/2018 | Kuniyasu | B05D 1/26 |
| 2019/0193076 A1 | 6/2019 | Dudenhoefer | |
| 2020/0411346 A1* | 12/2020 | Oh | B05B 12/124 |

* cited by examiner

ALIGNMENT DEVICES

BACKGROUND

Printing devices are used to eject a printing fluid onto a surface such as a printing media. The ejection of the printing fluid onto the surface at specific locations creates an image. The precision of the ejection of the fluid can increase the quality of the printed product.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
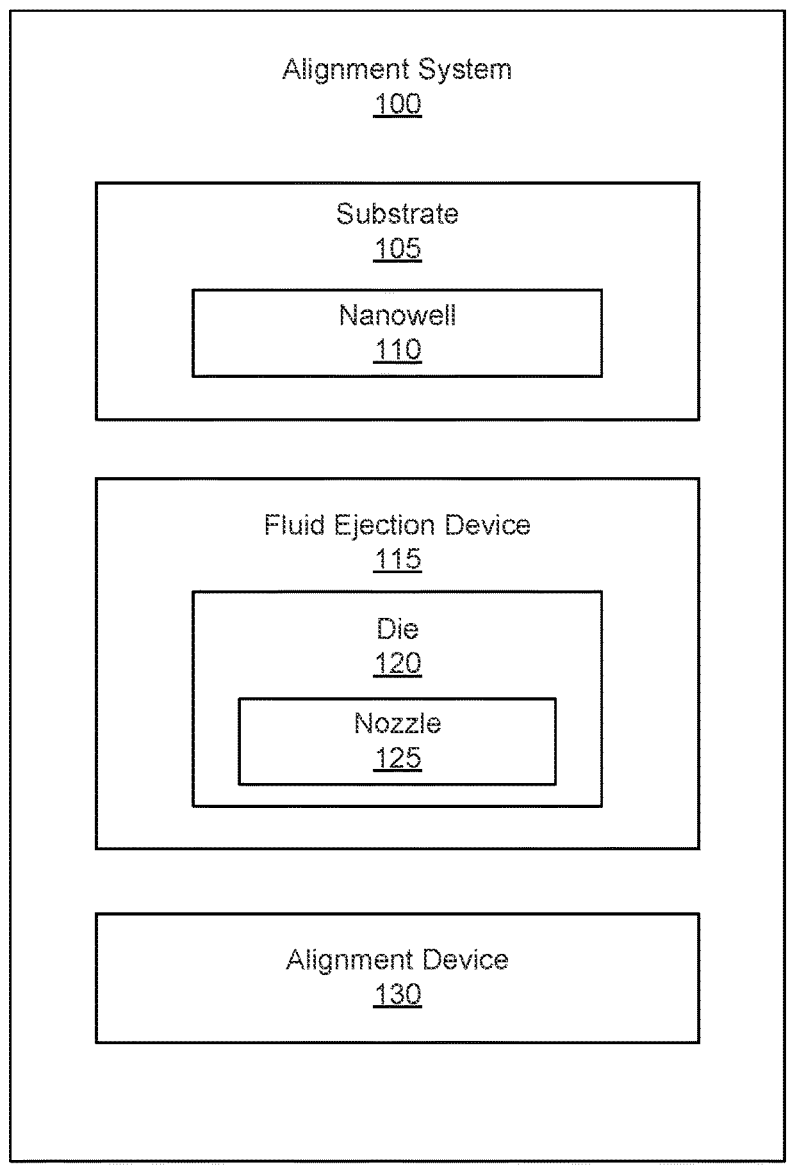
FIG. 1 is a diagram of an alignment system according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A printing device may eject a printing fluid onto the surface of a print media in order to precisely deposit an amount of fluid onto a deposition surface. In some examples, the printing device may be used to dispense precision quantities of fluids into wells on a well-plate. During use, a plurality of nozzles is fired simultaneously in order to dispense these fluids into micro-size wells. These micro-sized wells would otherwise be filled using, for example, a pipetting technique. The micro-wells may have inlet area cross-sections that are many times greater than the size of the orifice of the nozzle formed in a die of a fluid ejection device used by the printing device. In some examples, the micro-wells may have an inlet area greater than 11,000 times the size of the orifice.

However, micro-wells use a relatively large volume of potentially expensive fluid which can take longer to fill with the nozzles and can take longer for a biochemical assay to be implemented. Nanowells include those wells that have in inlet cross-sectional area that is, at most, 625 times the size of the orifice of a nozzle. Because of the dispensing precision of the printing device, these individual nanowells may be addressed by a single nozzle in the die. Additionally, the size of the nanowells reduces the amount of fluid used to fill the nanowell as compared to a micro-well, as well as reduce the time to fill the nanowell.

The precision firing of the nozzles of the printing device allows for the fluid to be ejected into the nanowells. Aligning the nozzles with the nanowells prevents spillage over into other nanowells, preventing contamination. Additionally, using the nozzles to eject the fluid into the nanowells prevents cross-contamination when compared to human conducted pipetting or any other type of pipetting.

The present specification describes an alignment system that includes a substrate that includes at least one nanowell, at least one fluid ejection device comprising at least one die, the at least one die comprising at least one nozzle, and an alignment device to align the at least one nozzle to the at least one nanowell.

The present specification also describes a fluid ejection device that includes a light source to pass light towards a reflective surface on a substrate, the substrate comprising at least one nanowell, and at least one light sensor positioned on the fluid ejection device to receive reflected light off of a portion of the substrate.

The present specification further describes a digital dispenser that includes a processor, a fluid ejection device comprising a die, the die comprising a nozzle, a fluid reservoir fluidically coupled to the fluid ejection device to supply the fluid ejection device with a fluid, and a light source coupled to the fluid ejection device.

As used in the present specification and in the appended claims, the term "substrate" is meant to be understood as any surface used to receive a fluid such as a chemical and/or biological sample.

Additionally, as used in the present specification and in the appended claims, the term "nanowell" is meant to be understood as a target area on a substrate that may maintain a nanoliter or a picoliter amount of fluid. In an example, the nanowell is a concave structure formed on a plate into which a nanoliter amount of fluid may be dispensed. In another example, the nanowell is a two-dimensional surface such as paper or glass that does not have a concave structure but instead is a targeted area on the two-dimensional surface. Because of certain surface tensions between certain fluids and surfaces, the nanowell in this example may be defined on the two-dimensional surface. In an example, the nanowell may have an opening having a circular diameter of less than or equal to 1.1 mm.

Turning now to the figures, FIG. 1 is a diagram of an alignment system (100) according to an example of the principles described herein. The alignment system (100) may include a substrate (105), a fluid ejection device (115), and an alignment device (130) to align at least one nanowell (110) of the substrate (105) with at least one nozzle (125) of a die (120) formed on the fluid ejection device (115).

The substrate (105) may be made of any type of material including, but not limited to, metal, glass, plastic, or paper. In an example, the substrate (105) may be formed into a two-dimensional plate. In this example, the nanowell (110) of the substrate (105) may be formed as a target location along the surface of the two-dimensional plane. In this example, the target location may be defined by a chemical barrier formed around the target location. In an example, the nanowell (110) is a concave well formed into the surface of the substrate (105) that may hold an amount of fluid ejected from the nozzle (125) of the die (120). In this example, the volume of the nanowell (110) may be on the scale of nanoliters. In an example, the nanowell (110) may have a 30 nanoliter volumetric capacity. In an example, the nanowell (110) may have a 50 nanoliter volumetric capacity. In an example, the nanowell (110) may have a volumetric capacity between 1 and 1000 nanoliters. In an example, the nanowell (110) may have a volumetric capacity of 500 picoliters.

As described herein, the nanoliter volume of the nanowell (110) may decrease the amount of fluid ejected into the nanowell (110), thereby saving costs in fluid ejected. In some examples, the fluid ejected may be relatively expensive and limiting the use of these fluids would reduce the costs in operating the alignment system (100). This is especially true where the use of fluid in amounts exceeding nanoliters would not affect a chemical or analytical outcome of the analysis conducted within the nanowell (110). Additionally, the nozzle (125) of the die (120), in addition to being relatively more precise than, for example, a pipette, ejects amounts of fluid on the scale of picoliters. With such relatively small amounts of fluid ejected from the nanowell (110), it will take longer to fill a micro-well than to fill the nanowell (110) described herein, thus reducing the time in operation. Using a nanowell with nanoliter fluid volume also may increase the speed at which a chemical or biochemical reaction occurs inside the nanowell. Additionally, nanowells may be packed into a relatively denser two-dimensional array thereby allowing for relatively more experiments and/or reactions to be completed in the same area as that taken up by a number of micro-wells.

The substrate (105) may include any number of nanowells (110). In an example, a plurality of nanowells (110) may be grouped together into groups such as an array of nanowells (110). In an example, each of the arrays of nanowells (110) may be representative of certain reactions or analysis to be conducted. The die (120) may be provided with any number of fluids to be ejected into any one or multiples of the nanowells (110).

The fluid ejection device (115) may be any type of device that provides any number of fluids to a die (120) coupled to or associated with the fluid ejection device (115). In an example, the fluid ejection device (115) may be in the form of a cartridge with at least one reservoir maintaining at least one fluid to be provided to the die (120). In an example, the fluid ejection device (115) may be in the form of an array of die or, in other examples, a page-wide array of die (120).

In an example, the fluid ejection device (115) may include a plurality of die (120) with any number of nozzles (125) of any one of the die (120) being provided with a distinct type of fluid to be ejected out of at least one nozzle (125) formed therein.

Each nozzle (125) may include a fluid chamber to receive and maintain an amount of fluid therein. The fluid chamber may house a fluid actuator such as a thermal resistive device or a piezoelectric device. The nozzle (125) may further include an orifice through which the fluids may be ejected. In an example, the orifice of the nozzle (125) may be, at least, $\frac{1}{625}$ths the size of an opening of a nanowell (110).

The alignment device (130) may include a light source formed onto a surface of the fluid ejection device (115). The light source may be used to shine a light, collimated or not, towards a substrate (105). In an example, the substrate (105) includes a reflective surface off of which the light may be reflected. In an example, a portion of a surface of the substrate (105) may include a reflective surface, material, or device. In these examples, the light is reflected back to a light sensor formed on a portion of the fluid ejection device (115). When the reflective surface or reflective device reflects the light from the light source and detected by the light sensor, alignment of at least one nozzle (125) with at least one nanowell (110) of the substrate (105) is accomplished. In these examples, the direction of the light from the light source and/or the reflective properties and/or position of the reflective surface or device is set such that movement of the fluid ejection device (115) and/or substrate (105) at a specific relative location causes the light to be detected at the light sensor.

In an example, the substrate (105) includes a light sensor to sense the light, collimated or not, from the light source. In this example, the substrate (105) may further include an electrical interface that interfaces with the fluid ejection device (115) to send a signal indicating that light has been sensed from the light source. This, therefore, indicates that alignment of at least one nozzle (125) of the die (120) with at least one nanowell (110) of the substrate (105) has occurred.

In an example, the light source may direct light through a surface of the fluid ejection device (115). In some examples, the light source may direct light through the die (120). In an example, the light sensor may be coupled to at least one die (120) of the fluid ejection device (115).

In an example, the alignment device (130) may include a plurality of light sensors. In an example, the plurality of light sensors may be affixed to either the fluid ejection device (115) or substrate (105). In an example, the plurality of light sensors may be fixed to both the fluid ejection device (115) and the substrate (105). In these examples that include a plurality of light sensors, when light is sensed at each light sensor of the plurality of light sensors, at least one nanowell (110) of the substrate (105) may be aligned with at least one nozzle (125) of the die (120) in a commensurate number of dimensions. As an example, where two light sensors are used and light is sensed at both light sensors, at least one nanowell (110) of the substrate (105) is aligned with at least one nozzle (125) of the die (120) in two dimensions. These two dimensions may include an x-axis, a y-axis, a z-axis, a pitch of the substrate (105), a yaw of the substrate (105), among other dimensions.

During operation, the alignment system (100), via execution of computer-usable or computer-readable program code or instructions by a processor, may direct the substrate (105) and/or fluid ejection device (115) to move relative to each other. For example, the alignment system (100) may move the at least one nanowell (110) of the substrate (105) to the at least one nozzle (125) of the die (120), or vice versa. As the light from the light source is detected at the light sensor, or as the light from the light source is reflected off of the reflective surface of the substrate (105) and detected at the light sensor, the movement of the at least one nanowell (110) of the substrate (105) to at least the at least one nozzle (125) of the die (120), or vice versa, is stopped. An amount of fluid may then be ejected from the nozzle (125) into the nanowell (110) of the substrate (105). In an example, the alignment device (130) aligns a plurality of nozzles (125) of the die (120) with a plurality of nanowells (110) of the substrate (105). In this example, the nozzles (125) may eject an amount of fluid into a plurality of nanowells (110) simultaneously or asynchronously.

Figure 2:
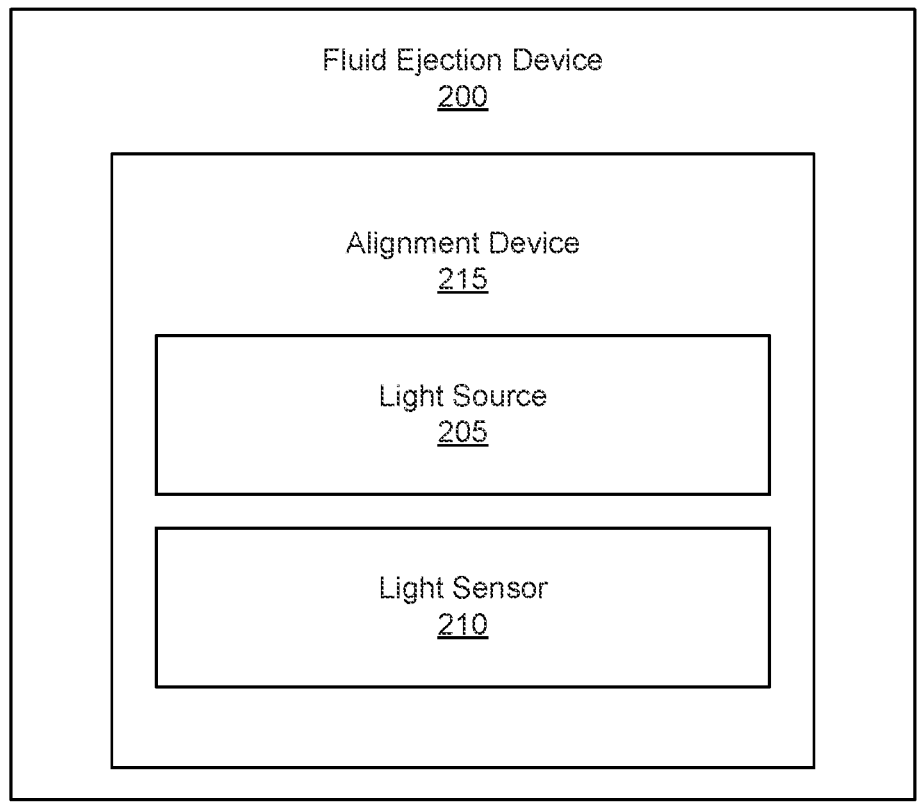
FIG. 2 is a block diagram of a fluid ejection device according to an example of the principles described herein.

FIG. 2 is a block diagram of a fluid ejection device (200) according to an example of the principles described herein. The fluid ejection device (200) may include an alignment device (215) that includes a light source (205) to pass light towards a reflective surface of a substrate (105). The reflected light may be, when at least one nanowell (110) of the substrate (105) is aligned with at least one nozzle (125) of the die (120), received at a light sensor (210). In some examples, the light source (205) and the light sensor (210) may be considered to be a part of the alignment device. The alignment device (215) may include any number of light sources, (205) that form the light sensors (210) of the alignment device (215). In an example, the alignment device (215) may include a light source (205), a light sensor (210)

and a reflective device to reflect light received from the light source (205) to the light sensor (210). These examples are described in detail herein.

In an example, the fluid ejection device (200) may include a plurality of light sensors (210). In an example, the plurality of light sensors (210) may be affixed to either a fluid ejection device (FIG. 1, 115) or substrate (FIG. 1, 105). In an example, the plurality of light sensors (210) may be fixed to both the fluid ejection device (115) and the substrate (105). In these examples that include a plurality of light sensors (210), when light is sensed at each of the plurality of light sensors (210), at least one nanowell (110) of the substrate (105) may be aligned with at least one nozzle (125) of the die (120) in a commensurate number of dimensions. As an example, where two light sensors (210) are used and light is sensed at both light sensors (210), at least one nanowell (110) of the substrate (105) is aligned with at least one nozzle (125) of the die (120) in two dimensions. These two dimensions may include an x-axis, a y-axis, a z-axis, a pitch of the substrate (105), a yaw of the substrate (105), among other dimensions.

Figure 3:
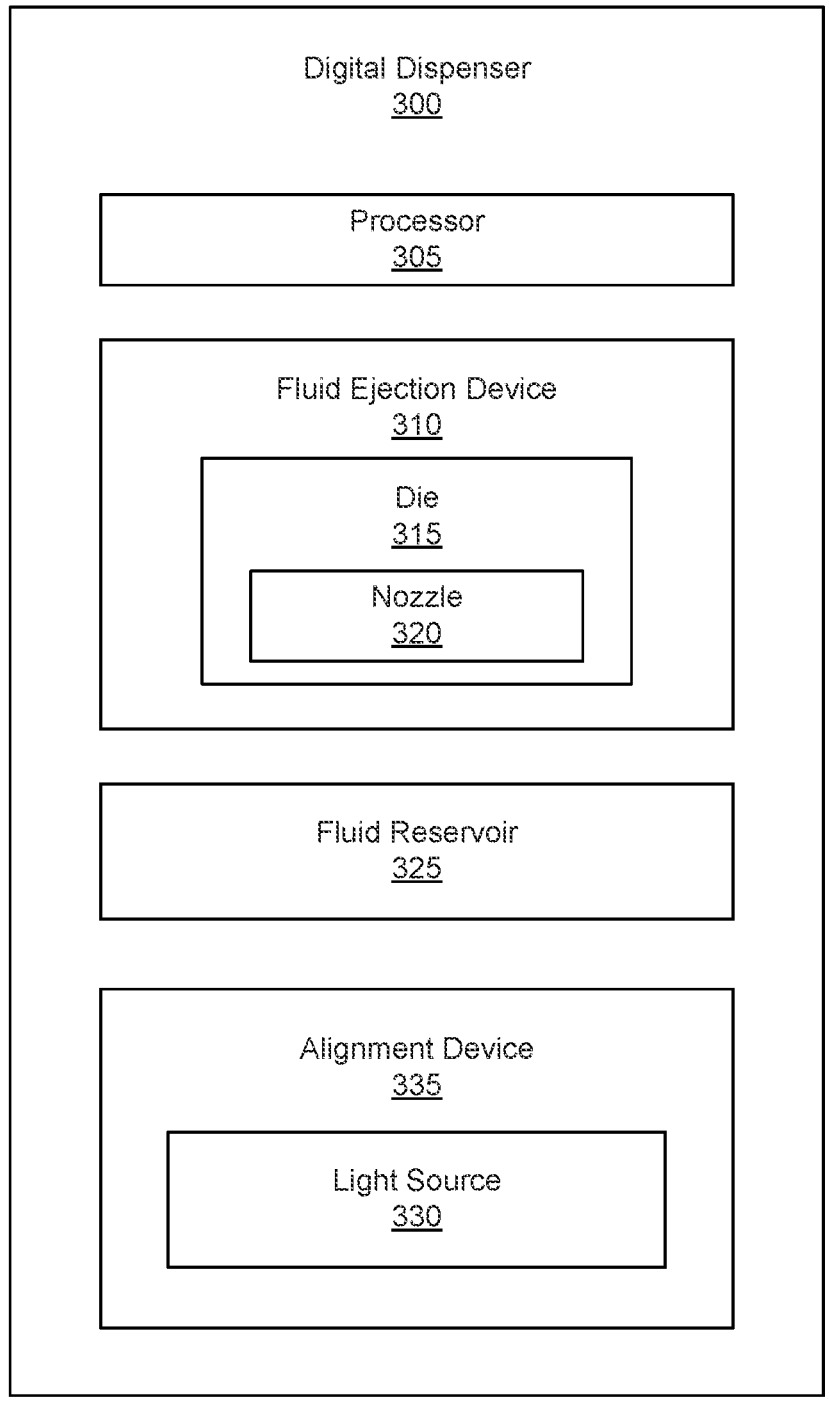
FIG. 3 is a block diagram of a digital dispenser according to an example of the principles described herein.

FIG. 3 is a block diagram of a digital dispenser (300) according to an example of the principles described herein. The digital dispenser (300) may by any type of device that, through execution of computer-usable program code by a processor (305), aligns at least one nozzle (320) formed in a die (315) of a fluid ejection device (310) with at least one nanowell of a substrate (105). Additionally, the digital dispenser (300) may direct the fluid ejection device (310) to eject a fluid when the at least one nozzle (320) formed in a die (315) of a fluid ejection device (310) is aligned with at least one nanowell of a substrate (105).

The fluid may be maintained in a reservoir (325) fluidically coupled to at least one die (315) of the fluid ejection device (310). The reservoir (325) may continually provide the die (315) with any type of fluid to be ejected out of the nozzles (320). In some examples, the fluid ejected may be one or a combination of solvent-based pharmaceutical compounds, aqueous-based pharmaceutical compounds, aqueous-based biomolecules comprising proteins, enzymes, lipids, antibiotics, mastermix, primer, DNA samples, cells, blood components, surfactants, or glycerol. Any of these types of fluids may be ejected from any of the nozzles (320) of the die (315) in order to complete a chemical reaction, analyze an analyte, or complete any type of diagnosis.

In some examples, the digital dispenser (300) may include an alignment device (335) that includes a light source (330). As described herein, the light source (330) may be any type of light source (330) that can send or transmit light to, for example, a reflective device to be reflected from off of a reflective surface of the reflective device and sensed at a light sensor. Alternatively, the light source (330) may be any type of light source (330) that can send or transmit light to be received directly at a light sensor.

Figure 4:
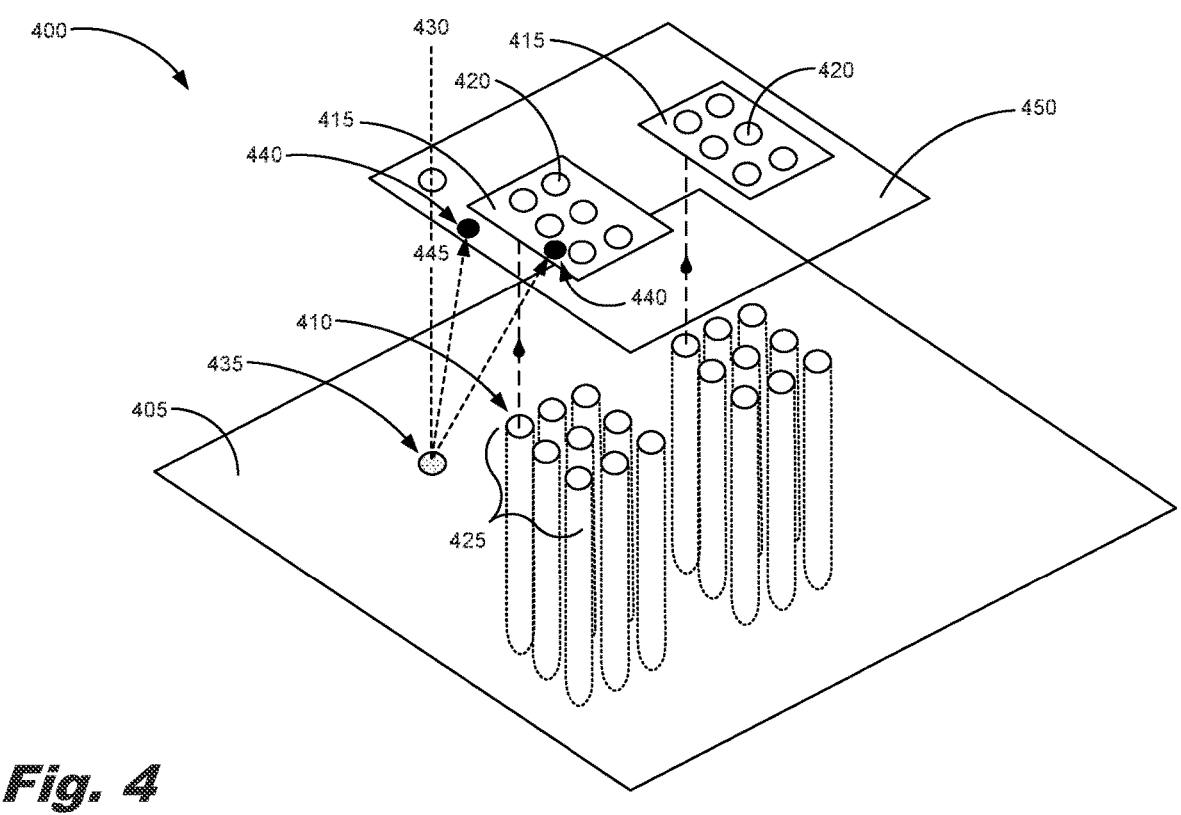
FIG. 4 is a perspective view of an alignment system according to an example of the principles described herein.

FIG. 4 is a perspective view of an alignment system (400) according to an example of the principles described herein. In the example shown in FIG. 4, the alignment system (400) includes a substrate (405) having a plurality of nanowells (410) formed therein. In an example, the plurality of nanowells (410) may be formed into arrays (425) of nanowells (410). The number of nanowells (410) in each of the arrays (425) may be more or less than the nine nanowells (410) depicted in FIG. 4. Additionally, the number of arrays (425) may be more or less than the two arrays (425) depicted in FIG. 4.

The alignment system (400) may further include a plurality of die (415) of a fluid ejection device (450) having a plurality of nozzles (420) formed therein. In an example, each die (415) may eject a type of fluid similar or distinct from the type of fluid ejected from other die (415). In an example, each nozzle (420) may eject a type of fluid similar or distinct from the type of fluid ejected from other nozzles (420).

The alignment system (400) may further include a light source (430) that transmits light, in this example, through a surface of a fluid ejection device (450). The transmitted light (445) may be received at a reflective surface of the substrate (405) or, in the example shown in FIG. 4, a reflective device (435) placed on the surface of the substrate (405). The reflective device (435) may be any type of device that can selectively reflect the transmitted light back to a light sensor (440) placed on the fluid ejection device (450), or the die (415).

In an example, the reflective device (435) is a device that can, with the presence of a plurality light sources (430) and a plurality of reflective devices (435), selectively reflect the transmitted light back to a light sensor (440) on the fluid ejection device (450) and the die (415). In this example, the two light sensors (440) allow for the alignment of at least one nanowell (410) of the substrate (405) to be aligned vertically with at least one nozzle (420) of at least one die (415). This creates alignment among at least two dimensions either in the x-axis, the y-axis, the z-axis, the pitch of the substrate (405), the yaw of the substrate (405), among other dimensions.

Figure 5:
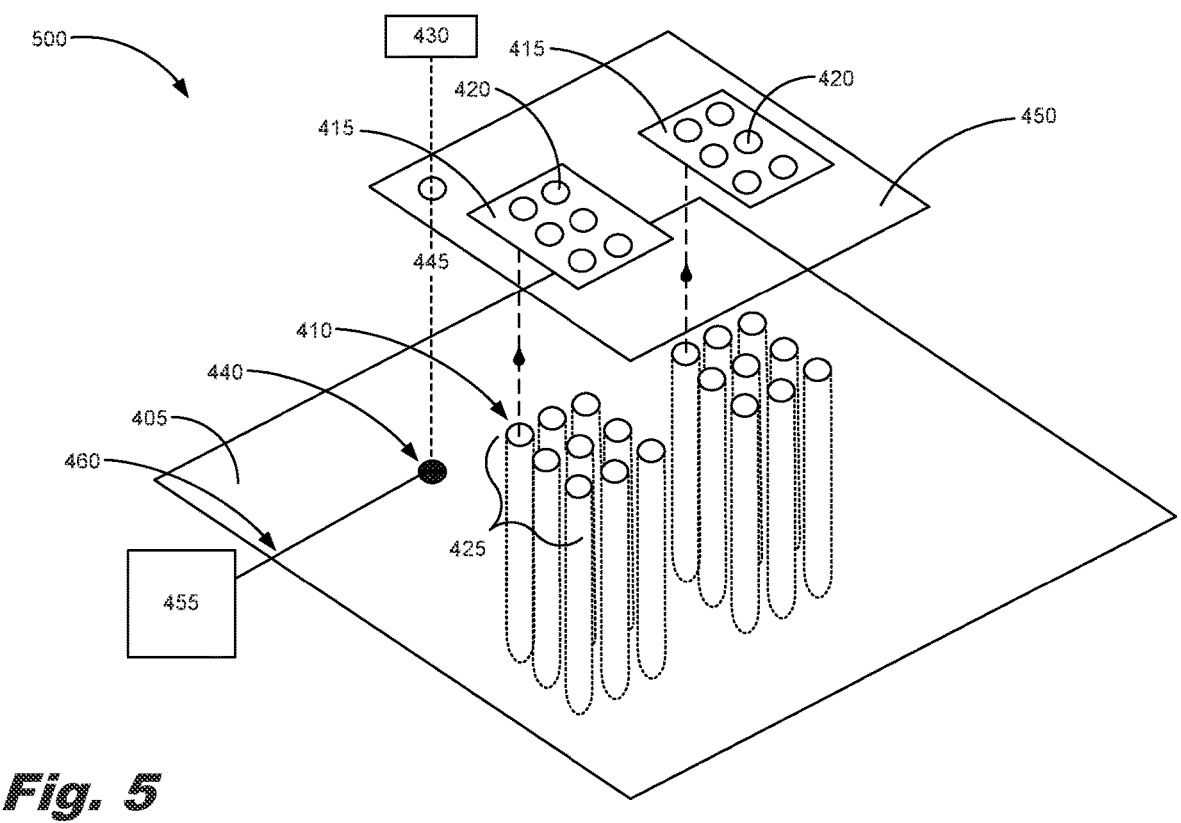
FIG. 5 is a perspective view of an alignment system according to an example of the principles described herein.

FIG. 5 is a perspective view of an alignment system (500) according to an example of the principles described herein. The alignment system (500) may be similar to that depicted in FIG. 4 except for that the light sensor (440) is formed on the surface of the substrate (405) instead of on the fluid ejection device (450) and/or die (415). Additionally, no reflective surface or reflective device (435) is formed on the surface of the substrate (405).

Because the light sensor (440) is formed on the surface of the substrate (405), an electrical lead (460) electrically couples the light sensor (440) to, for example, a processor (455). A signal may be received at the processor (455) from the light sensor (440) when light is detected indicating that alignment has occurred as described herein. Additional electrical leads (460) may be formed on the substrate (405) in order to provide power to the light sensor (440).

Figure 6:
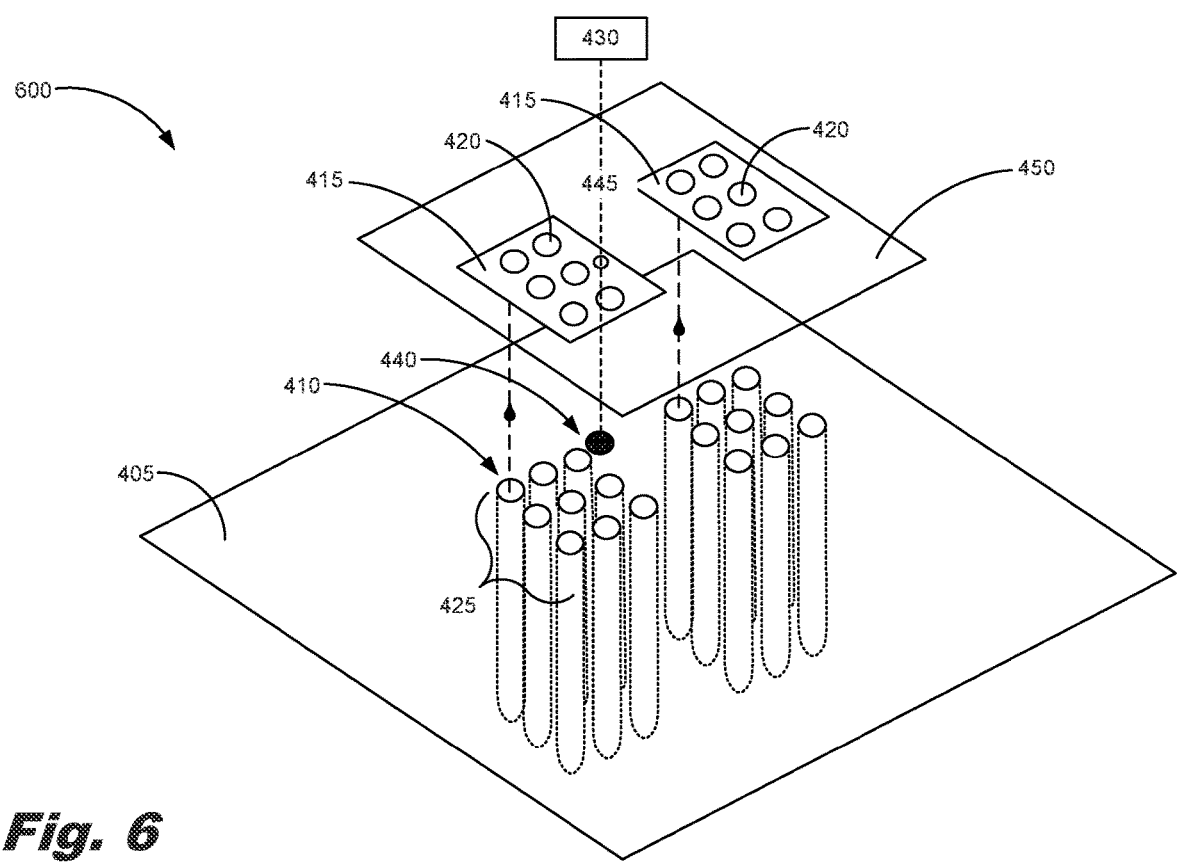
FIG. 6 is a perspective view of an alignment system according to an example of the principles described herein.

FIG. 6 is a perspective view of an alignment system (600) according to an example of the principles described herein. The alignment system (600) may be similar to that depicted in FIGS. 4 and 5 except for that the light source (430) transmits light through at least one die (415) instead of through a surface of the fluid ejection device (450) as in FIGS. 4 and 5.

The specification and figures describe an alignment system that may include an ejection device with a die having at least one nozzle. The alignment system described herein aligns the at least one nozzle with at least one nanowell defined in or on a substrate using a light source and a light sensor. In some examples, a reflective surface may be used as well. The alignment system describe herein allows for alignment of the nozzle and nanowell without having to eject an amount of the fluid. This, in turn, preserves fluid usage and reduces contamination of any nanowell due to errant ejections of fluid. Additionally, in some examples, alignment of one nozzle with one nanowell may result in the alignment of multiple nozzles with respective multiple nanowells. This allows for multiple fluid ejections to be carried out simultaneously without having to move the substrate relative to the fluid ejection device to achieve alignment between other respective nozzles and nanowells.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid dispenser system comprising:
a substrate comprising at least one nanowell;
at least one fluid ejection device comprising at least one die, the at least one die comprising at least one nozzle; and
an alignment device comprising:
at least one light source to pass light towards a reflective surface on the substrate, the reflective surface to redirect a beam of light; and
at least one light sensor positioned on the at least one fluid ejection device to receive the redirected beam of light from the reflective surface on the substrate.

2. The fluid dispenser system of claim 1, wherein at least one nozzle of the fluid ejection device is aligned with the at least one nanowell of the substrate if the at least one light sensor receives the reflected light.

3. The fluid dispenser system of claim 1, wherein the at least one light source is to pass light towards the reflective surface through a die formed into the fluid ejection device.

4. The fluid dispenser system of claim 1, wherein the at least one light sensor comprises two light sensors, and wherein the at least one nanowell is aligned with at least one nozzle of the fluid ejection device in two dimensions when the two light sensors receive the reflected light.

5. The fluid dispenser system of claim 4, wherein the two different dimensions comprise one of a pitch of the substrate and a yaw of the substrate.

6. The fluid dispenser system of claim 4, wherein a single light source provides the reflected light detected by both of the two light sensors.

7. The fluid dispenser system of claim 1, further comprising a window in a surface of the fluid ejection device, wherein the at least one light source is positioned to pass light through the window in the surface of the fluid ejection device before the light is detected by the at least one light sensor.

8. The fluid dispenser system of claim 1, further comprising a window in the at least one die, wherein the at least one light source is positioned to pass light through the window in the at least one die such that the light is reflected from the reflective surface on the substrate and directed to the at least one light sensor when the at least one nanowell is aligned with a nozzle of the at least one die.

9. The fluid dispenser system of claim 1, wherein the at least one light source is disposed on the at least one fluid ejection device.

10. A digital dispenser, comprising:
a processor;
a fluid ejection device comprising a die, the die comprising a nozzle;
a fluid reservoir fluidically coupled to the fluid ejection device to supply the fluid ejection device with a fluid; and
an alignment device to align the nozzle with a nanowell of a substrate, the alignment device comprising:
a light source coupled to the fluid ejection device to pass light towards a reflective surface on the substrate, the reflective surface to redirect a beam of light; and
at least one light sensor positioned on the at least one fluid ejection device to receive the redirected beam of light from the reflective surface on the substrate.

11. The digital dispenser of claim 10, wherein the light source propagates light through a surface of the fluid ejection device.

12. The digital dispenser of claim 10, wherein the light source propagates light through a die coupled to the fluid ejection device.

13. The digital dispenser of claim 10, wherein the reflective surface comprises a reflector.

14. A fluid ejection device comprising:
an alignment device comprising:
at least one light source to pass light towards a reflective surface on a substrate, the substrate comprising at least one nanowell; and
at least one light sensor positioned on the fluid ejection device to receive reflected light from a reflective surface on the substrate, wherein the at least one light sensor moves with the fluid ejection device relative to the substrate and, at a specific relative location, light reflected from the reflective surface of the substrate can be detected by the light sensor to indicate alignment of the substrate and fluid ejection device.

15. The fluid ejection device of claim 14, wherein at least one nozzle of the fluid ejection device is aligned with the at least one nanowell of the substrate if the at least one light sensor receives the reflected light.

16. The fluid ejection device of claim 14, wherein the at least one light source is to pass light towards the reflective surface through a fluid ejection die formed into the fluid ejection device.

17. The fluid ejection device of claim 14, wherein the at least one light sensor comprises two light sensors, and wherein the at least one nanowell is aligned with at least one nozzle of the fluid ejection device in two dimensions if the two light sensors receive the reflected light.

18. The fluid ejection device of claim 17, wherein the two different dimensions comprise one of a pitch of the substrate and a yaw of the substrate.

19. The fluid ejection device of claim 17, wherein a single light source provides the reflected light that is detected by both of the two light sensors.

20. The fluid ejection device of claim 14, further comprising a window in a surface of the fluid ejection device, wherein the at least one light source is positioned to pass light through the window in the surface of the fluid ejection device before the light is detected by the at least one light sensor.

* * * * *